June 11, 1963
H. S. SANDERSON
3,093,202
GRAVITY ACTUATED APPARATUS FOR WEIGHING
GRANULAR MATERIAL AND THE LIKE
Filed Dec. 14, 1961
2 Sheets-Sheet 1
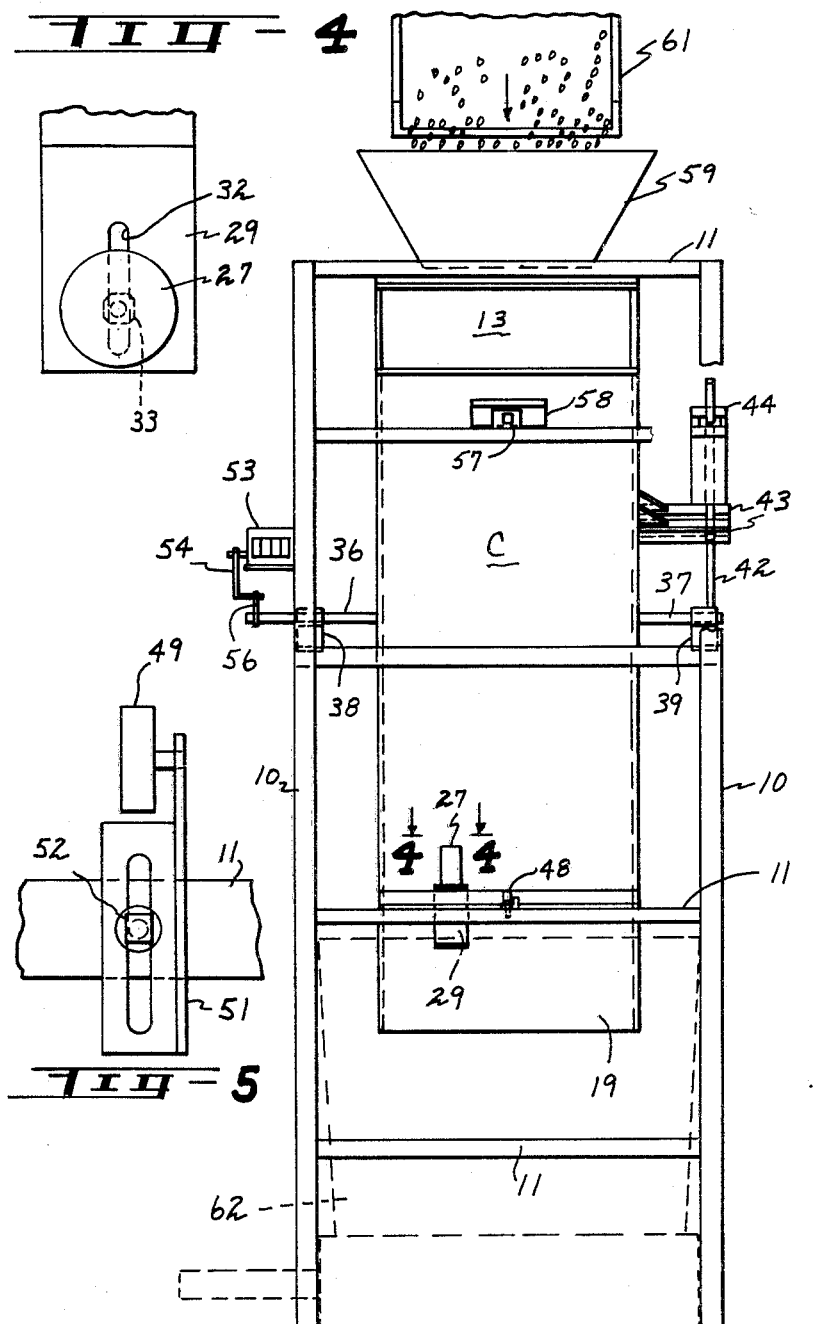
INVENTOR.
Hansel S. Sanderson
BY
Jennings, Carter & Thompson
Attorneys June 11, 1963
H. S. SANDERSON
3,093,202
GRAVITY ACTUATED APPARATUS FOR WEIGHING
GRANULAR MATERIAL AND THE LIKE
Filed Dec. 14, 1961
2 Sheets-Sheet 2
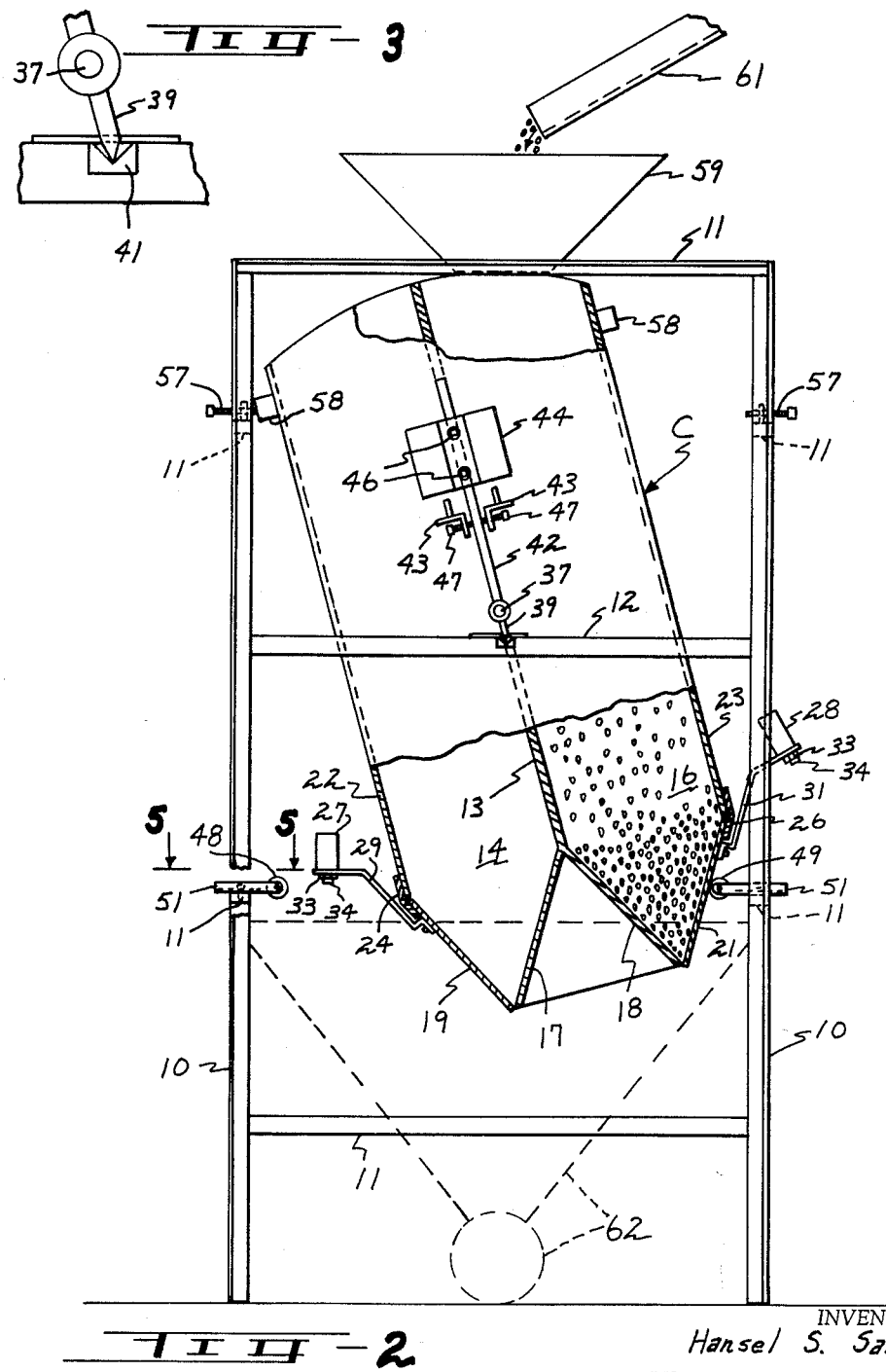
INVENTOR.
Hansel S. Sanderson
BY Jennings, Carter & Thompson
Attorneys

United States Patent Office 3,093,202
Patented June 11, 1963

3,093,202
GRAVITY ACTUATED APPARATUS FOR WEIGHING GRANULAR MATERIAL AND THE LIKE
Hansel S. Sanderson, Decatur, Ala., assignor of fifty percent to C. E. Anthony, Tupelo, Miss.
Filed Dec. 14, 1961, Ser. No. 159,312
3 Claims. (Cl. 177—96)

This invention relates to apparatus for weighing granular material, such for instance as cottonseed and the like as the same is delivered in a continuous manner as from a battery of cotton gins.

An object of my invention is to provide simple, rugged and positively operating, gravity actuated apparatus for weighing granular materials and one which shall be especially adapted for weighing such material as it is delivered to the apparatus in a substantially continuous stream, as from a chute, supply hopper, or the like.

More particularly, an object is to provide apparatus of the character designated which consists essentially of a container divided into two, side-by-side compartments, together with means to mount the container for substantially friction-free rocking or "flip-flop" manner about a horizontal axis, together with material actuated, gravity closures at the bottom of each compartment, whereby as the material is delivered to the compartment which has its bottom raised above a vertical plane passing through the axis of rotation, the whole container will rock about said axis, after delivery of the predetermined weight of material thereto, permitting the door of the loaded compartment to open, discharging the material, and simultaneously bringing the other or empty compartment into material receiving position.

Further objects of my invention are to provide the gravity actuated closures with means to bias them toward closed position with a force sufficient to hold the closures in closed position when empty, and yet insufficient to prevent a given weight of material from opening the same as the container rocks; to hold the doors of the compartments positively closed during the loading operation of the compartments; to provide means for balancing the container for rocking motion about the axis above named; and in general, to provide a highly efficient, inexpensive weighing apparatus.

Apparatus illustrating features of my invention is shown in the accompanying drawings, forming a part of this application, in which:

FIG. 1 is an end elevational view with certain parts broken away and in section;

FIG. 2 is a side elevational view with certain parts broken away and in section;

FIG. 3 is an enlarged view of one of the knife-edge bearings for supporting the container;

FIG. 4 is an enlarged detail plan view taken generally along line 4—4 of FIG. 1; and, FIG. 5 is an enlarged detail plan view taken generally along line 5—5 of FIG. 2.

Referring to the drawings for a better understanding of my invention, I illustrate the same as embodying a framework consisting of vertical members 10 and cross members 11 near the top and bottom of members 10. The framework thus formed is centrally open.

Also extending between the pairs of members 10 are cross members 12. The rockable or "flip-flop" container of my improved weighing apparatus indicated generally by the letter C is mounted within the frame as will presently appear.

As first will be noted, the container C is generally vertically elongated and is divided by a central partition wall 13 into two compartments 14 and 16. The compartments are open at the top and are provided with hopper bottom sides 17 and 18, respectively.

It will also be noted that at the bottom the compartments 14 and 16 are provided with closures in the form of doors 19 and 21, respectively. The doors are pivoted to the walls 22 and 23 of the respective compartments by hinges 24 and 26.

The doors are biased toward closed position by means of weights 27 and 28 mounted on bracket arms 29 and 31 secured to the respective doors 19 and 21. As will be seen in FIG. 4 wherein the weight 27 and its associated arm 29 is illustrated, the arms 29 are provided with slots 32 and the weights are held in place by means of nuts 33 screwed onto the threaded ends of studs 34 projecting from the bottoms of the weights. The weights and their distances from the hinges of the doors are such that the force exerted on the doors, while sufficient to hold the doors closed when the compartments are empty, is insufficient to prevent the same from opening when the compartments are loaded with a predetermined weight of material as also will presently appear.

The entire compartment C is supported on stub axles 36 and 37 by means of knife-edge bearing plates 38 and 39 fitting in V-shaped complementary seats 41. See particularly FIG. 3 wherein the knife-edge plate 39 and shaft 37 are detailed. It will be understood that the knife-edge plates 38 and 39 are fast on the respective shafts 36 and 37.

Projecting upwardly from one of the knife-edge plates, for instance 39, and secured in effect, therefore, to the shaft 37, is a vertical rod-like member 42. The rod 42 passes between a pair of angles 43 secured to the side of the container C. Slidably mounted on the rod, above the angles 43 is a weight 44 held in adjusted position along the length of the rod 42 by means of set screws 46. Passing through the downturned ledge of the angles 43 are set screws 47 by means of which the angular position of the rod 42 and hence the position of the weights 44 relative to the vertical center line of the container C may be adjusted.

Secured to the cross members 11, in position to engage the outer surfaces of the respective doors 21 and 19 are stop members 48 and 49. The members 48 are mounted on the ends of slotted brackets 51. The brackets are held adjustably positioned by means of a stud 52 threaded into the members 11. See FIG. 5. Mounted on the framework is a counter 53. A depending arm 54 is engaged by an arm 56 fast on one of the shafts, for instance 36, so that with each rocking motion of the container the counter is actuated, thus providing a totalizing of the weight during any given period of operation of the weighing apparatus.

Mounted also on certain ones of the cross members 11 are adjustable stops in the form of threaded bolts 57 which are adapted to engage pads 58 on the upper sides of the container.

A hopper 59 is mounted in fixed manner on top of the framework 11 in such position that when the container is rocked as illustrated in FIG. 2 when compartment 16 is thereunder, or reversely when compartment 14 is thereunder, material is supplied to the compartments. A chute 61 may deliver the material in a generally continuously flowing stream to the hopper and thence into the then being filled compartment 16 or 14.

From the foregoing the method of constructing and using my improved apparatus may now be explained and understood. It will be appreciated that by moving the weight 44 up or down on the rod 42 and by suitably adjusting the studs 47, the unbalance of the container about the horizontal axis of the pivot points may be predetermined. In other words, when empty of any material the adjustment is made so that the container as a whole is tiltably unstable relative to a vertical plane passing through the knife-edge pivots, and by an amount which can be overcome by loading the compartments with a predetermined weight of material. Further, the container is now adjusted in respective tilted positions by means of the studs 57 and by suitably adjusting the stops 49 and 48 so that when fully rocked to either side the associated stop 48 or 49 holds the respective doors 21 and 19 in closed position. Further, the weights 27 and 28 are adjusted so that when the compartments are empty of material the doors are biased toward closed position with a force sufficient to hold them closed, but not sufficient to prevent them from opening against the weight of a predetermined amount of material, as the container rocks.

With the apparatus balanced and adjusted as aforesaid, the container is permitted to rock to one side and material is fed into the hopper from the trough 61 where it fills the compartment then under the hopper. Assuming it to be the compartment 16, as shown in FIG. 2, as soon as a predetermined weight of material has fallen into the compartment 16, gravity causes the container to rock. As soon as the door 21 moves away from the stop 49, the weight of the material in the hopper bottom of compartment 16 causes the doors 21 to open, dumping the material into any suitable collection means beneath the container, such as illustrated by the dotted lines at 62. As soon as the vertical wall 13 passes to the right as viewed in FIG. 2 of the hoppers 59, material is then being supplied into compartment 14. The reverse action occurs as soon as a predetermined weight of material is delivered into 14.

From the foregoing it will be apparent that I have devised an improved, simple and positive apparatus for weighing granular materials. My invention has been put to practical use in the weighing of cottonseed wherein it is important to assure that the customer receives all of the seed from the bales that he has brought to the gin. By setting the totalizer 53 back to zero upon the ginning of each customer's cotton, such customers know precisely the weight of seed from their respective bales.

It is to be especially noted that once set in operation my improved apparatus continues its rocking motion as the compartments are filled and emptied. Likewise, even though during the movement of dividing wall 13 beneath the hopper a small amount of the material may spill into both compartments, this is immaterial because the number of rocking motions for any appreciable batch of material is not affected, and consequently the number of counts on the totalizer 53 represents the true weight of the material passed through the apparatus.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:
1. In weighing apparatus,
 (a) a container divided into two side-by-side material receiving compartments,
 (b) closures for each compartment at the lower ends thereof biased toward closed position with a force sufficient to close the compartments when empty of material,
 (c) means mounting the container for bodily rocking motion about a horizontal axis whereby the bottom of each of said compartments in turn is located at a higher elevation than the other,
 (d) means to supply material into the compartments, alternately and into the one which at any given time has its bottom raised above the other,
 (e) and stationary members for positively holding closed the closure for the compartment being loaded, whereby upon loading the compartments with the predetermined weight of material gravity causes the container to rock, thus permitting the material in said loaded compartment to open the closure thereof and discharge therefrom by gravity.

2. In gravity actuated weighing apparatus for granular material and the like,
 (a) a container divided into side-by-side compartments,
 (b) hopper bottoms for the compartments,
 (c) a pivoted closure for each hopper bottom,
 (d) means biasing the closures to closed position with a force sufficient to hold the closures in closed position when the compartments are empty,
 (e) means mounting the container for bodily rocking movement out of a true vertical position into positions in which the hopper bottom of each compartment alternately is at higher elevation than the bottom of the other compartment,
 (f) fixed members separately mounted from the closures against which the outer surfaces of the closures of the higher elevated compartment rests, thereby to maintain said closure in closed position while its compartment is being loaded with material as hereinafter stated,
 (g) and supply means for the material to be weighed located over the container, whereby the container having its bottom raised relative to the bottom of the other container is loaded and after receiving a predetermined weight of material the container rocks, thereby permitting the material in the loaded compartment to discharge therefrom by gravity and positioning the empty compartment under the material supply means.

3. In gravity actuated weighing apparatus,
 (a) a vertically elongated container supported intermediate its length for "flip-flop" rocking motion about a substantially horizontal axis which is below the center of mass of the container by a predetermined amount,
 (b) means dividing the container into a pair of side-by-side open-top compartments,
 (c) pivoted doors at the bottom of the compartments biased toward closed position with a force sufficient to hold the doors closed when the compartments are empty and insufficient to hold them closed when the compartments are loaded with a predetermined weight of material to be weighed,
 (d) means located above the container to deliver a generally continuous stream of material to be weighed and positioned to discharge the same into the one of said compartments which has its lower end raised above the lower end of the other compartment,
 (e) stationary members against which the outer surface of the doors engage during loading of the associated compartment thereby positively to hold the doors closed during loading of the compartments,
 (f) and adjustable weight means associated with the container substantially to balance the weight of the container about the axis of movement.

References Cited in the file of this patent
UNITED STATES PATENTS

| | | |
|---|---|---|
| 837,794 | Carter | Dec. 4, 1906 |
| 1,235,000 | Balmert | July 31, 1917 |
| 2,942,836 | Meyer | June 28, 1960 |
| 3,013,622 | Meyer | Dec. 19, 1961 |